United States Patent
Zankharia et al.

(10) Patent No.: US 11,163,908 B2
(45) Date of Patent: Nov. 2, 2021

(54) DEVICE STATE DRIVEN ENCRYPTION KEY MANAGEMENT

(71) Applicant: Microsoft Technology Licensing, LLC, Redmond, WA (US)

(72) Inventors: Samarth Sudhanshu Zankharia, Redmond, WA (US); Octavian Tony Ureche, Bellevue, WA (US); Narendra Shripati Acharya, Kirkland, WA (US); Alex Mark Semenko, Issaquah, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 299 days.

(21) Appl. No.: 16/297,218

(22) Filed: Mar. 8, 2019

(65) Prior Publication Data

US 2020/0285775 A1 Sep. 10, 2020

(51) Int. Cl.
| | |
|---|---|
| *G06F 11/30* | (2006.01) |
| *G06F 12/14* | (2006.01) |
| *G06F 21/62* | (2013.01) |
| *G06F 21/60* | (2013.01) |

(52) U.S. Cl.
CPC ...... *G06F 21/6281* (2013.01); *G06F 12/1408* (2013.01); *G06F 12/1466* (2013.01); *G06F 21/602* (2013.01)

(58) Field of Classification Search
CPC ............. G06F 12/1408; G06F 12/1466; G06F 21/602; G06F 21/6281; G06F 21/31; G06F 21/6218; H04W 12/06
See application file for complete search history.

(56) References Cited

U.S. PATENT DOCUMENTS

| | | | | |
|---|---|---|---|---|
| 8,402,278 | B2 * | 3/2013 | Gassoway | G06F 21/6209 713/189 |
| 9,811,680 | B2 * | 11/2017 | Balasubramanian | ... H04L 63/06 |
| 10,205,594 | B1 * | 2/2019 | Kaufman | H04L 9/0891 |
| 2006/0053306 | A1 * | 3/2006 | Adams | G06F 21/57 713/190 |
| 2009/0158052 | A1 * | 6/2009 | Yasuda | H04L 63/0435 713/189 |
| 2011/0185186 | A1 * | 7/2011 | Adams | H04W 12/02 713/189 |
| 2013/0305047 | A1 * | 11/2013 | Xi | H04W 12/06 713/168 |

(Continued)

OTHER PUBLICATIONS

"Feature and Technical Overview—BlackBerry Enterprise Server for IBM Lotus Domino V4.I.611", Retrieved From: http://docs.blackberry.com/en/admin/deliverables/2740/FT0_D_456681_11.pdf, Jul. 14, 2008, 79 Pages.

(Continued)

*Primary Examiner* — Gary S Gracia
(74) *Attorney, Agent, or Firm* — Arent Fox LLP

(57) ABSTRACT

Methods and devices for accessing encrypted data on a computer device may include determining that a current device state of the computer device is locked. The methods and devices may include using a level two encryption key to encrypt data associated with at least one application while the computer device is locked. The methods and devices may include using a temporary decryption key in memory of the computer device to access level two encrypted data while the computer device is locked.

17 Claims, 5 Drawing Sheets

(56) References Cited

U.S. PATENT DOCUMENTS

| | | | | |
|---|---|---|---|---|
| 2014/0096178 A1* | 4/2014 | Shippy | ............... | H04L 63/105 |
| | | | | 726/1 |
| 2015/0189510 A1* | 7/2015 | Enright | ............... | H04W 12/12 |
| | | | | 455/411 |
| 2016/0182464 A1* | 6/2016 | Mintz | ............... | H04L 9/3228 |
| | | | | 713/170 |
| 2016/0253520 A1* | 9/2016 | Moon | ............... | G06F 21/602 |
| | | | | 713/190 |
| 2016/0255061 A1* | 9/2016 | Syed-Ebrahim | ...... | H04L 63/045 |
| | | | | 713/171 |
| 2016/0330024 A1 | 11/2016 | Brouwer et al. | | |
| 2017/0272245 A1* | 9/2017 | Norton | ............... | H04L 9/0894 |
| 2017/0288867 A1* | 10/2017 | Collier | ............... | G06F 21/31 |
| 2018/0069699 A1* | 3/2018 | Bowman | ............... | H04L 9/0841 |

OTHER PUBLICATIONS

International Search Report and Written Opinion Issued in PCT Application No. PCT/US2020/020241, dated Jun. 8, 2020, 12 Pages.

Skillen, et al., "Deadbolt: Locking Down Android Disk Encryption", In the Proceedings of Third ACM Workshop on Security and Privacy in Smartphones & Mobile Devices, Nov. 2013, pp. 3-14.

\* cited by examiner

DEVICE STATE DRIVEN ENCRYPTION KEY MANAGEMENT

BACKGROUND

The present disclosure relates to computer devices and data protection.

Data protection technologies play a critical role in securing enterprise and user data. The changing landscape of the device ecosystem and the proliferation of web services, challenge the limits of existing data protection technologies. A key challenge with data protection is to protect keys used to encrypt data and data on a locked device against attacks that leverage direct memory access or potential vulnerabilities.

Thus, there is a need in the art for improvements in data protection for computer devices.

SUMMARY

The following presents a simplified summary of one or more implementations of the present disclosure in order to provide a basic understanding of such implementations. This summary is not an extensive overview of all contemplated implementations, and is intended to neither identify key or critical elements of all implementations nor delineate the scope of any or all implementations. Its sole purpose is to present some concepts of one or more implementations of the present disclosure in a simplified form as a prelude to the more detailed description that is presented later.

One example implementation relates to a computer device. The computer device may include a memory to store data and instructions, a processor in communication with the memory. The processor may be configured to determine that a current device state of the computer device is locked; use a level two encryption key to encrypt data associated with at least one application while the computer device is locked; and use a temporary decryption key in the memory to access level two encrypted data while the computer device is locked.

Another example implementation relates to a method for accessing encrypted data on a computer device. The method may include determining, by an operating system on the computer device, that a current device state of the computer device is locked. The method may include using a level two encryption key to encrypt data associated with at least one application while the computer device is locked. The method may include using a temporary decryption key in memory of the computer device to access level two encrypted data while the computer device is locked.

Another example implementation relates to computer-readable medium storing instructions executable by a computer device. The computer-readable medium may include at least one instruction for causing the computer device to determine that a current device state of the computer device is locked. The computer-readable medium may include at least one instruction for causing the computer device to use a level two encryption key to encrypt data associated with at least one application while the computer device is locked. The computer-readable medium may include at least one instruction for causing the computer device to use a temporary decryption key in the memory to access level two encrypted data while the computer device is locked.

Additional advantages and novel features relating to implementations of the present disclosure will be set forth in part in the description that follows, and in part will become more apparent to those skilled in the art upon examination of the following or upon learning by practice thereof.

DETAILED DESCRIPTION

Figure 1:
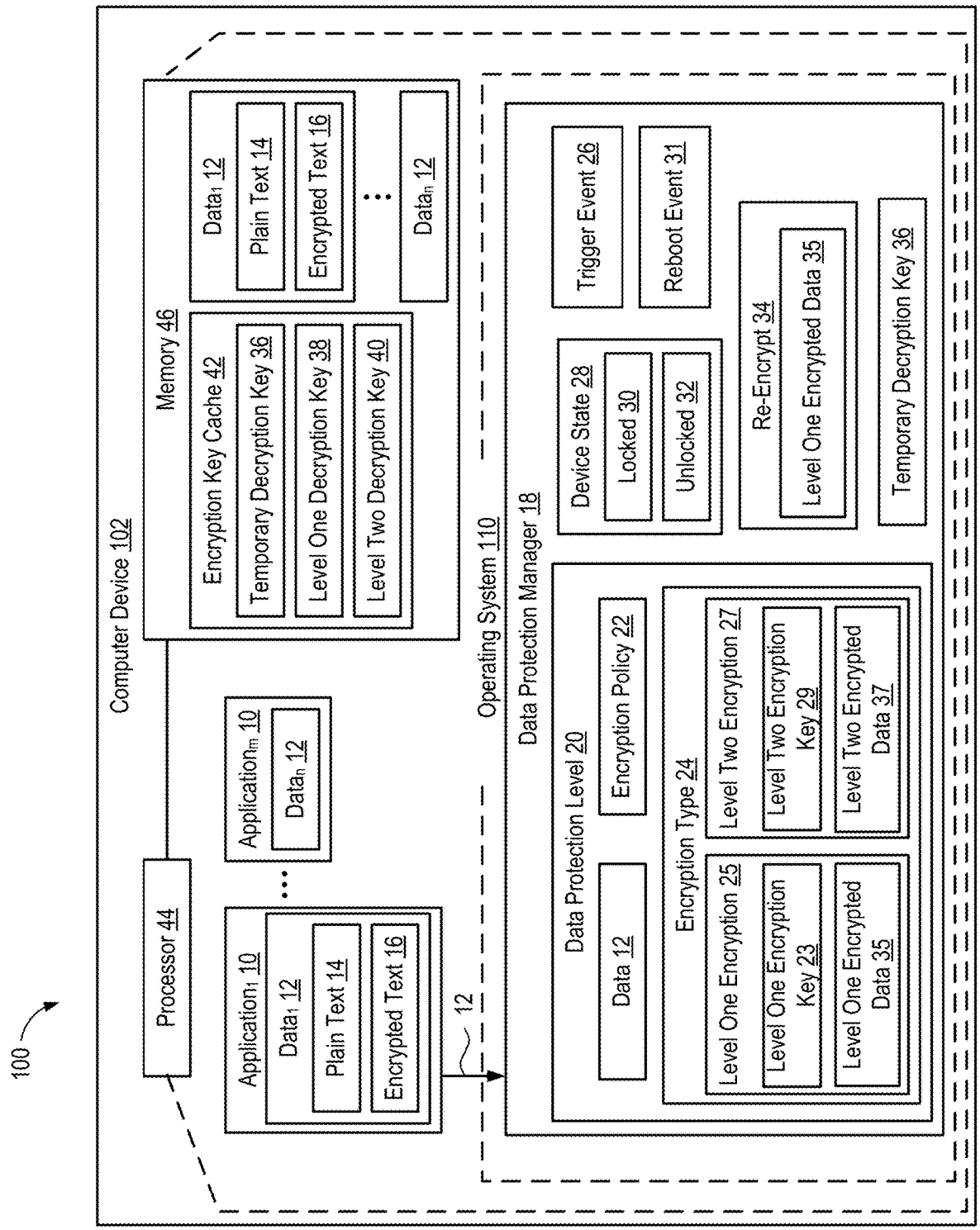
FIG. 1 is a schematic block diagram of an example computer device in accordance with an implementation of the present disclosure.

This disclosure relates to devices and methods for data protection of data and files on a computer device. Different applications operating on a computer device may have various levels of data protection. Some applications may not encrypt data associated with the applications. For example, an alarm application may not protect the data associated with the alarm settings (e.g., time and date of the alarm). While other applications may encrypt data so that if an unauthorized access to the data occurred, the encrypted data may not be accessible without access to the corresponding decryption key(s).

An increasing number of devices today, such as, phones and tablets, support a connected standby mode wherein the device rarely hibernates or shuts down. For instance, connected standby is a device operating mode in some operating systems in which a device can remain in a low-powered, idle condition but can still be transitioned immediately to a fully operational state. When a device is always on, a locked state and the connected standby state are what fall under the user perception of an "off" state for the device. As such, it is critical to protect data, and/or the keys used to encrypt and/or decrypt data, in these states.

Data protection under lock (DPL) functionality, which may remove decryption keys from memory when a computer device is in a locked state, provides some level of security in the locked state. Previously, there were two levels of persistence of decryption keys in memory of a computer device in order to access encrypted data. A level one decryption key may be available after the first device unlock throughout the boot session (e.g., the level one encryption key is computed after the computer device boots and remains in memory until the computer device reboots and/or restarts). A level one encryption may be automatically applied to application data, for example, by the operating system without knowledge of the applications. As such, protecting application data using a level one encryption may be easily scaled to all applications on the computer device since the operating system protects the application data using the level one encryption keys without knowledge of the applications and/or any changes to the operations of the applications. However, because the level one decryption key remains in memory during the entire boot session, which may be a significant period of time (e.g., weeks or months), a direct memory attack (DMA) may be able to retrieve the level one decryption key and access the application data encrypted using the level one encryption key.

A level two decryption key may only be available when the computer device is unlocked. For example, once the computer device enters into a locked state, the level two decryption key may be removed from the memory of the computer device. Another level two decryption key may be re-computed upon receipt of a user entropy at the computer device, such as, but not limited to, a personal identification number (PIN), a password, and/or biometric information. Applications that choose to use the level two decryption may access the encrypted level two data using the level two decryption key. Applications may need to modify operations (e.g., application programming interface (API) calls and/or how data is read) when using the level two encryption, and thus, it may be more burdensome for applications to use the level two encryption for data. If a computer device is stolen and/or lost when locked, only the notifications shown above the lock screen (e.g., displayed while locked) may be accessible and data protected using the level two decryption key may not be accessible since the level two decryption key is no longer in memory. As such, using a level two encryption may provide a higher level of protection relative to using a level one decryption key.

Despite the above features of the DPL functionality, some security vulnerabilities still exist, as when a computer device is in a locked state, applications executing on the computer device may continue to synchronize data and/or show notifications above the lock screen.

According to the present disclosure, in order to balance the security of data and user-experience of the computer device, additional transient states where decryption keys are persisted in memory may be provided. The devices and methods described herein may provide additional states where decryption keys may be persisted in memory of the computer device so that a highest level of security may be provided to data while allowing applications to operate without modifications and/or changes.

In an example implementation, the devices and methods may provide a temporary decryption key in memory to access data encrypted using a level two encryption when a trigger occurs (e.g., when a computer device is locked) so that applications may use the temporary decryption key to access the level two encrypted data.

For example, previously when a user uses a camera application on the computer device to take a picture while the computer device is locked, if the image data is encrypted using a level two encryption key, the camera application may not be able to access the encrypted level two image data while the device is locked (e.g., display the image, apply a filter to the image). Once the computer device is unlocked, the camera application may access the encrypted level two image data using the level two decryption key. In contrast, the devices and methods of this disclosure may allow the camera application to use the temporary decryption key in memory to access the level two encrypted image data for play back on the display and/or operations while the computer device is locked. As such, even though the computer device is locked, the camera application may continue to operate normally on the protected image data through use of the temporary decryption key in memory. When the computer device is unlocked, the temporary decryption key may be removed from memory and the camera application may access the encrypted data using a level two decryption key.

In another example implementation, the devices and methods of this disclosure may provide level one protection to data, and upon a trigger event occurring, further provide a higher level of protect to the data (e.g., a level two protection). For instance, the operating system may identify data protected using level one encryption prior to the trigger event, and upon the trigger event occurring, the operating system may re-encrypt the identified level one encrypted data using a level two encryption key. As such, the data may be efficiently protected at a higher level of protection (e.g., level two encryption) without the applications performing an action to receive a higher level of protection.

In another example implementation, the devices and methods of this disclosure may persist a level one decryption key in memory after a reboot occurs on the computer device. By persisting the decryption keys currently in memory across a reboot event, the computer device may remain in the same state of security it was prior to the reboot event. Thus, using this procedure, notifications may continue to present above the lock screen after the reboot event.

The devices and methods of this disclosure may provide additional states where decryption keys may be persisted in memory of the computer device while the computer device is locked so that a higher level of security may be provided to data while allowing applications to operate without modifications and/or changes. As such, the devices and method may improve a user-experience of the computer device by allowing applications to continue to access encrypted data when a computer device is locked, while providing a higher level of security to the data.

Referring now to FIG. 1, a system 100 for use with data protection on a computer device 102 includes one or more transient states where decryption keys are persisted in memory. Computer device 102 may include one or more applications 10 (up to m, where m is an integer) capable of executing on computer device 102. Applications 10 may receive, generate, and/or use data 12. Data 12 may have various levels of data protection provided by computer device 102. For example, data 12 for an alarm application may be in plain text 14 since the data may not be encrypted, while data 12 for an e-mail application may be in encrypted text 16 so that if the data 12 was improperly intercepted, the data may not be accessible without access to the corresponding decryption key.

Applications 10 may be executed by processor 44 and/or memory 46. Memory 46 of computer device 102 may be configured for storing data and/or computer-executable instructions defining and/or associated with operating system 110, and processor 44 may execute such data and/or instructions to instantiate operating system 110. An example of memory 46 can include, but is not limited to, a type of memory usable by a computer, such as random access memory (RAM), read only memory (ROM), tapes, magnetic discs, optical discs, volatile memory, non-volatile memory, and any combination thereof. An example of processor 44 can include, but is not limited to, any processor specially programmed as described herein, including a controller, microcontroller, application specific integrated circuit (ASIC), field programmable gate array (FPGA), system on chip (SoC), or other programmable logic or state machine.

Operating system 110 may include a data protection manager 18 that determines a data protection level 20 for data 12. For example, the data protection level 20 may determine whether data 12 contains plain text 14 and/or whether data 12 contains encrypted text 16. In addition, the data protection level 20 may determine an encryption type 24 to apply to data 12 (e.g., level one encryption 25 or level two encryption 27).

A level one encryption 25 may use a level one encryption key 23 to encrypt data 12. In addition, a level one encryption 25 may use a level one decryption key 38 to access (e.g., decrypt) the level one encrypted data 35. The level one decryption key 38 may remain in memory 46 until a reboot event 31 occurs for computer device 102. As such, until computer device 102 reboots and/or restarts, the level one decryption key 38 may remain in memory 46 and may be used to access the level one encrypted data 35.

A level two encryption 27 may use a level two encryption key 29 to encrypt data 12 and a level two decryption key 40 may be used to access (e.g., decrypt) the level two encrypted data 37. Each time computer device 102 is locked 30, the level two decryption key 40 may be removed from memory 46. As such, when computer device 102 is locked, the level two encrypted data 37 may not be accessible using the level two decryption key 40. When the computer device 102 is unlocked 32, a new level two decryption key 40 may be generated and used to access the level two encrypted data 37.

In an example implementation, the data protection level 20 may be determined using an encryption policy 22. The encryption policy 22 may be received from, from example, a user setting, an application setting, and/or an operating system setting, and may determine different data protection levels 20 for different applications 10. The encryption policy 22 may determine the encryption type 24 to apply to data 12. For example, application 10 may opt into a level two encryption 27. As such, data 12 may be encrypted using a level two encryption key 29. Another example may include a user selecting a level one encryption 25 for identified applications 10 (e.g., data 12 associated with the identified applications 10 may be encrypted using a level one encryption key 23), while selecting a level two encryption 27 for other applications 10. Another example may include operating system 110 determining to apply a level two encryption 27 to applications 10. As such, the encryption policy 22 may be used to select whether data 12 is protected and what encryption type 24 to use for protecting data 12 (e.g., level one encryption 25 or level two encryption 27).

In addition, the data protection level 20 may change if one or more trigger events 26 occur. Trigger events 26 may include, but are not limited to, changes in device state 28 (e.g., locked 30 to unlocked 32 or unlocked 32 to locked 30), user input (e.g., when notifications are cleared by a user, turning off a display, or turning on a display), changes in a location of computer device 102, geofencing, a timer expiring, another user account activating on computer device 102, changes in network access (e.g., leaving a wired network access or wireless network range), a policy push to computer device 102, and/or any event that may trigger an operation where data 12 may be protected in a more secure manner. For example, a trigger event 26 may include locking or unlocking computer device 102. Another example trigger event 26 may include receiving a policy at computer device 102 that triggers changes in authorization behaviors for accessing encrypted data and/or requires an immediate lock of level two encrypted data. Another example trigger event 26 may include using geofencing to trigger a change in the data protection level 20. For example, when computer device 102 moves into and/or out of a location, the data protection level 20 for data 12 may change in response to the changes in device location. Another example trigger event 26 may include computer device 102 leaving a secure Wi-Fi range and/or connecting to an insecure or open Wi-Fi. The data protection level 20 of data 12 may change in response to changes in network access by computer device 102.

Another example trigger event 26 may include changes in an authorized Bluetooth device nearby access to encrypted data on computer device 102. For example, the data protection level 20 for data 12 on computer device 102 may change in response to the authorized Bluetooth device disconnecting from computer device 102 and/or moving out of range of computer device 102.

Trigger events 26 may be unary triggers (e.g., a single user action) or binary triggers (e.g., a complete cycle, such as, locking and unlocking computer device 102). There may be one or more trigger events 26 that may occur during the binary triggers. As such, rather than completing a full complete cycle for a binary trigger before modifying the encryption type 24 associated with data 12, an intermediate trigger may cause the encryption type 24 associated with data 12 to change. For example, a user may turn off a display during a lock, unlock cycle. Data protection manager 18 may determine whether one or more trigger events 26 has occurred.

In an implementation, when a trigger event 26 occurs, data protection manager 18 may use a temporary decryption key 36 stored in memory 46 to access data 12 encrypted using the level two encryption 27. When the trigger event 26 is finished, data protection manager 18 may remove the temporary decryption key 36 from the encryption key cache 42. A new level two decryption key 40 may be generated and stored in encryption key cache 42 for applications 10 to use to access the encrypted text 16 of data 12 until computer device 102 is locked 30 and/or restarted.

For example, when the trigger event 26 is the device state 28 of computer device 102 changing to locked 30, data protection manager 18 may allow applications 10 to access encrypted text 16 using the temporary decryption key 36. As such, applications 10 may be able to use encrypted text 16 while computer device 102 is locked 30 by using the temporary decryption key 36. When the device state 28 of computer device 102 changes to unlocked 32, data protection manager 18 may clear the encryption key cache 42 and remove the temporary decryption key 36. Applications 10 may use a new level two decryption key 40 created when computer device 102 is unlocked 32 to access the encrypted text 16 of data 12. As such, in this case, applications 10 may continue to access the level two encrypted data 37 while computer device 102 is locked 30 without using a level two decryption key 40.

In another implementation, when a trigger event 26 occurs, data protection manager 18 may identify level one encrypted data 35 and may re-encrypt 34 the level one encrypted data 35 using a level two decryption key 40. As such, data protection manager 18 may provide a relatively higher level of protection to the level one encrypted data 35 upon the trigger event 26 occurring. As such, in this case, data protection manager 18 may provide applications 10 with a relatively higher data protection level 20 without interrupting the operation of applications 10 when computer device 102 is locked 30.

In another example implementation, data protection manager 18 may determine a reboot event 31 of computer device 102 and apply certain data protections. A reboot event 31 may be when the device reboots and/or restarts. For example, an update may be provided to computer device 102 and computer device 102 may need to restart in order to complete the update. In this case, data protection manager 18 may temporarily prevent the level one decryption key 38 from being removed from encryption key cache 42 after the reboot event 31, for example, when a user entropy is captured and until the device state 28 changes from locked 30 to unlocked 32. Further, in this case, the keys currently in memory 46 may be persisted across the reboot event 31, leaving computer device 102 in the same state of security prior to the reboot event 31. As such, applications 10 may still be able to access encrypted text 16 after the reboot event 31 using the level one decryption key 38 until the device state 28 changes. Upon the device state 28 changing to unlocked 32, data protection manager 18 may remove the level one decryption key 38 from the encryption key cache 42.

Figure 2:
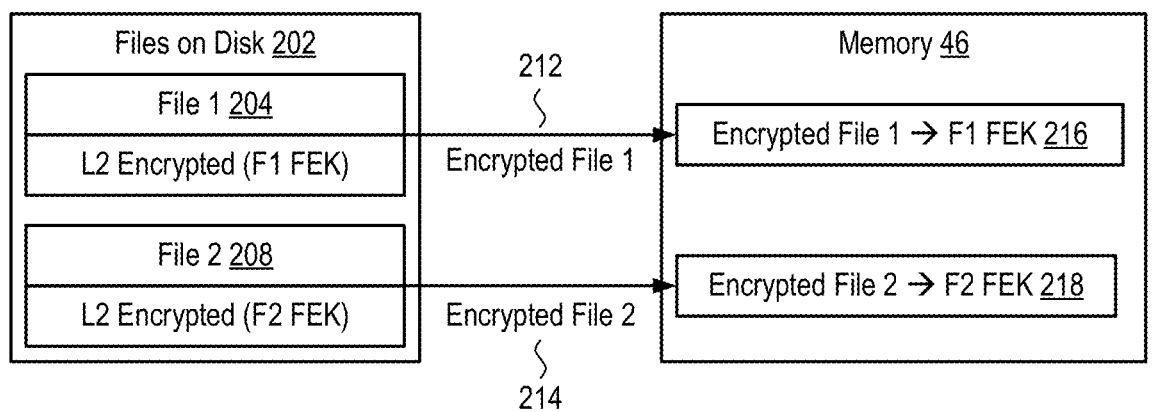
FIG. 2 is schematic diagram of an example of encrypting files on a computer device with a level two encryption.

Referring now to FIG. 2, illustrated is an example of encrypting files on disk 202 on computer device 102 (FIG. 1) with a level two encryption 27 (FIG. 1). A file encryption key (FEK) cache may store the plaintext file FEKs in-memory 46 until a trigger event 26 occurs. The plaintext file FEKs may correspond to the temporary decryption keys 36 (FIG. 1). When computer device 102 is locked, new files may be encrypted with a level two encryption key 29 (FIG. 1) and may be stored on disk. For example, the files on disk 202 may include file 1 (204) encrypted using a level two encryption key (F1 FEK) and file 2 (208) encrypted using a level two encryption key (F2 FEK). The FEK cache may create a table that associates the encrypted files with the corresponding FEK and stores the associations 216, 218 in memory 46.

For example, encrypted file 1 (212) may generate an association 216 that associates encrypted file 1 (212) with the level two encryption key used to encrypt file 1 (204). In addition, encrypted file 2 (214) may generate an association 218 that associates encrypted file 2 (214) with the level two encryption key used to encrypt file 2 (208).

When an encrypted file (e.g., encrypted file 1 (212) or encrypted file 2 (214)) is being accessed, the FEK cache is checked in memory 46. If the association 216, 218 is found for the encrypted file in the FEK cache, the encrypted file may be accessed using the plaintext FEK in memory 46. When a trigger event 26 occurs, the FEK cache may be flushed. As such, a higher level of protection may be provided to the files on disk 202 by removing the temporary plaintext FEK from memory 46 when the trigger event occurs 26.

Figure 3:
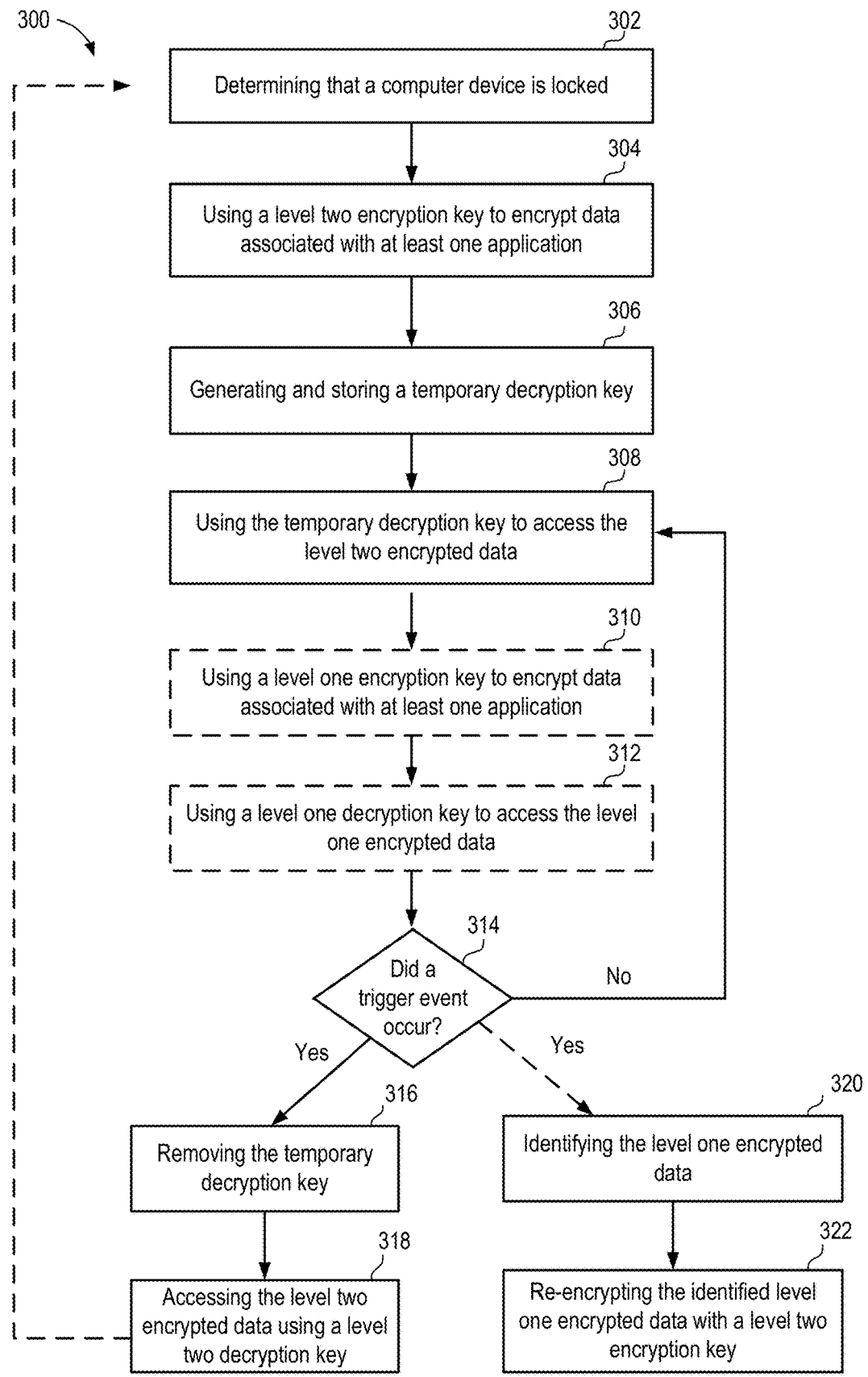
FIG. 3 is a flowchart of an example method for accessing encrypted data in accordance with an implementation of the present disclosure.

Referring now to FIG. 3, an example method 300 that may be used for accessing encrypted data while a computer device is locked is discussed in connection with the description of the architecture of FIG. 1.

At 302, method 300 may include determining that a computer device is locked. For example, data protection manager 18 may determine that a current device state 28 of computer device 102 is locked 30.

At 304, method 300 may include using a level two encryption key to encrypt data associated with at least one application. Computer device 102 may continue to receive and/or synchronize data 12 associated with one or more applications 10 while the device state is locked 30. Data protection manager 18 may determine a data protection level 20 to apply to data 12 (e.g., level one encryption 25 or level two encryption 27). For example, data protection manager 18 may determine to use a level two encryption 27 and may use a level two encryption key 29 to encrypt data 12 associated with at least one application 10.

In an example implementation, data protection manager 18 may use an encryption policy 22 to determine a data protection level 20 to apply to data 12 (e.g., level one encryption 25 or level two encryption 27). The encryption policy 22 may be received from, for example, a user setting, an application setting, and/or an operating system setting and may determine different data protection levels 20 for different applications 10. The encryption policy 22 may determine the encryption type 24 to apply to data 12. For example, application 10 may opt into a level two encryption 27. As such, data 12 may be encrypted using a level two encryption key 29.

At 306, method 300 may include generating and storing a temporary decryption key. Data protection manager 18 may generate a temporary decryption key 36 and store the temporary decryption key 36 in memory 46.

At 308, method 300 may include using the temporary decryption key to access the level two encrypted data 308. Data protection manager 18 may access the level two encrypted data 37 using the temporary decryption key 36 while computer device 102 is locked. For example, data protection manager 18 may use a file hash 316, 318 (FIG. 3), to determine the association between the temporary decryption key 36 and the level two encrypted data 37. Data protection manager 18 may use the determined association to access the level two encrypted data 37. As such, applications 10 may continue to access level two encrypted data 37 while computer device 102 is locked 30 without using a level two decryption key 40 by using the temporary decryption key 36 instead.

At 310, method 300 may optionally include using a level one encryption key to encrypt data associated with at least one application. Data protection manager 18 may determine to use a level one encryption 25 and may use a level one encryption key 23 to encrypt data 12. For example, data protection manager 18 may use an encryption policy 22 to determine to use a level one encryption 25 on data 12. A level one encryption key 23 may be automatically applied to application data 12. As such, protecting application data 12 using a level one encryption key 23 may be easily scaled to all applications 10 on computer device 102.

The level one encryption 25 may be used in addition to the level two encryption 27. For example, the encryption policy 22 may determine to encrypt a subset of application data 12 with a level one encryption 25 and a different subset of application data 12 with a level two encryption 27. In addition, the level one encryption 25 may be used instead of the level two encryption 27. For example, the encryption policy 22 may determine to encrypt the application data 12 with only a level one encryption 25.

At 312, method 300 may optionally include using a level one decryption key to access the level one encrypted data. For example, data protection manager 18 may use a level one decryption key 38 stored in memory 46 to access the level one encrypted data 35 while computer device 102 is locked 30. Data protection manager 18 may use the level one decryption key 38 without knowledge of applications 10. As such, applications 10 may continue to operate without modifications and/or changes, while receiving a level one encryption 25 for application data 12.

At 314, method 300 may include determining whether a trigger event occurred. Data protection manager 18 may determine whether one or more trigger events 26 occurred on computer device 102. Trigger events 26 may include, but are not limited to, changes in device state 28 (e.g., locked 30 to unlocked 32 or unlocked 32 to locked 30), user input (e.g., when notifications are cleared by a user, turning off a display, or turning on a display), changes in a location of computer device 102, geofencing, changes in network access (e.g., leaving a wired network access or wireless network range), a policy push to computer device 102, a timer expiring, another user account activating on computer device 102, and/or any event that may trigger an operation where data 12 may be protected in a more secure manner.

Trigger events 26 may be unary triggers (e.g., a single user action) or binary triggers (e.g., a complete cycle, such as, locking and unlocking computer device 102). There may be one or more trigger events 26 that may occur during the binary triggers. As such, rather than completing a full complete cycle for a binary trigger an intermediate trigger may occur before the end of the binary trigger.

At 316, method 300 may include removing the temporary decryption key. Data protection may remove the temporary decryption key 36 from the encryption key cache 42 in response to the one or more trigger events 26 occurring on computer device 102. For example, when computer device is unlocked 32, the temporary decryption key 36 may be removed from the encryption key cache 42 so that the level two encrypted data 37 may no longer be accessible using the temporary decryption key 36.

At 318, method 300 may include accessing the level two encrypted data using a level two decryption key. Data protection manager 18 may use a level two decryption key 40 generated in response to the one or more trigger events 26 occurring. For example, when computer device 102 is unlocked 32, a level two decryption key 40 may be generated and used to access the level two encrypted data 37 until computer device 102 is locked 30 and/or restarted. When computer device 102 is locked, method 300 may return to 302.

At 320, method 300 may optionally include identifying the level one encrypted data. For example, data protection manager 18 may identify any level one encrypted data 35 that was received while computer device 102 was locked in response to one or more trigger events 26 occurring on computer device 102. Data protection manager 18 may determine that a higher level of data protection may be necessary for the identified level one encrypted data 35.

At 322, method 300 may optionally include re-encrypting the identified level one encrypted data with a level two encryption key. Data protection manager may re-encrypt 34 the identified level one encrypted data 35 with a level two encryption key 29. In other words, data protection manager 18 may provide a higher level of protection to the level one encrypted data 35 upon the trigger event 26 occurring. As such, the data 12 may be efficiently protected at the highest level without applications 10 performing an action to receive a higher level of protection.

In summary, method 300 may provide applications 10 more flexibility in accessing level two encrypted data 37 while computer device 102 is locked 30. Moreover, method 300 may provide a relatively higher level of data security for computer device 102, as compared to current solutions, while allowing applications 10 to continue to operate normally when computer device 102 is locked 30.

Figure 4:
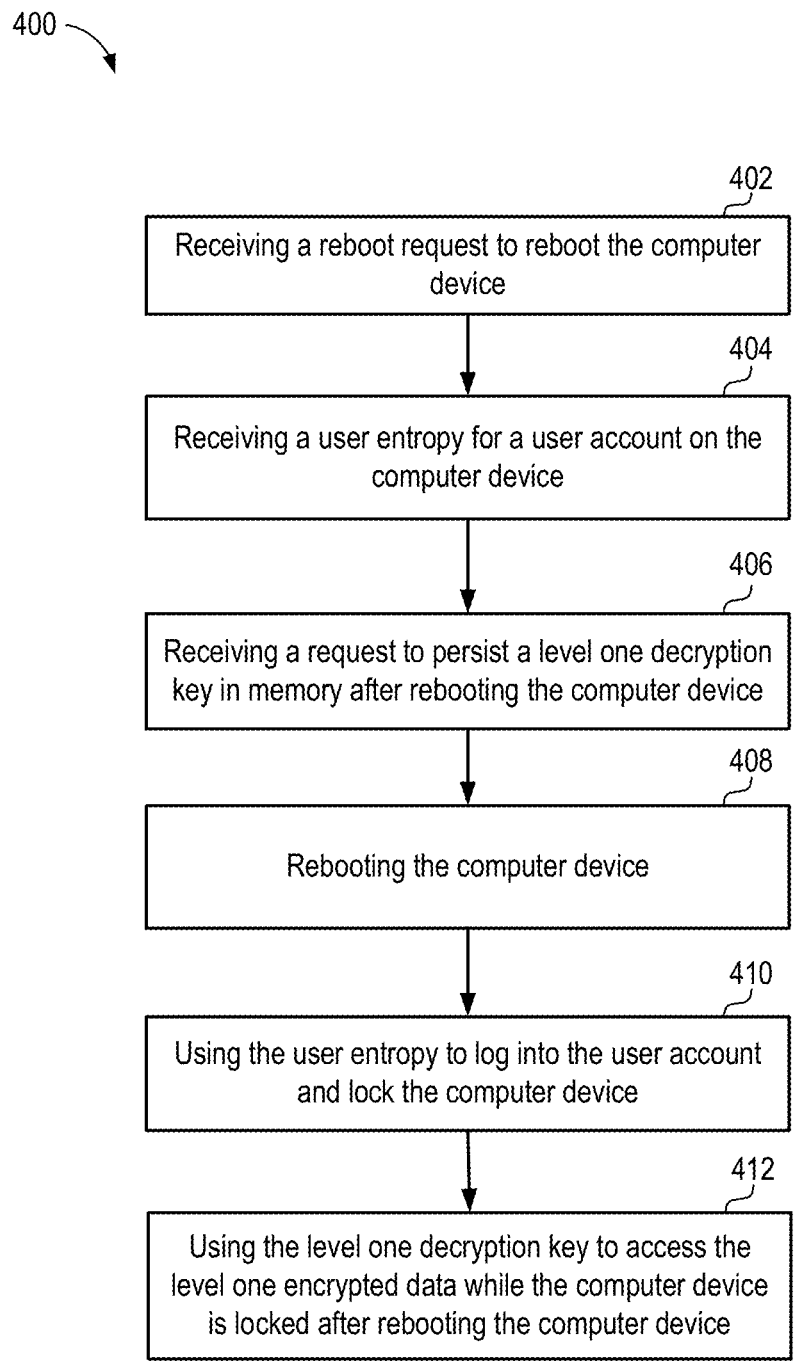
FIG. 4 is a message flow diagram associated with an example method for persisting a decryption key across a device reboot in accordance with an implementation of the present disclosure.

Referring now to FIG. 4, an example method 400 that may be used for persisting a level one decryption key in memory across a device reboot is discussed in connection with the description of the architecture of FIG. 1.

At 402, method 400 may include receiving a reboot request to reboot the computer device. A reboot event 31 may be when computer device 102 reboots and/or restarts. For example, an update may be provided to computer device 102 and computer device 102 may need to restart in order to complete the update. In an implementation, an automatic restart and sign on (ARSO) component on computer device 102 may indicate that a restart and/or reboot event 31 may need to occur on computer device 102. Generally, a level one decryption key 38 may remain in memory 46 until a reboot event 31 occurs for computer device 102. As such, until computer device 102 reboots and/or restarts, the level one decryption key 38 may remain in memory 46 and may be used to access any level one encrypted data 35.

At 404, method 400 may include receiving a user entropy for a user account on the computer device. Data protection manager 18 may receive the user entropy, such as, but not limited to, a PIN, a password, or biometric information. In an implementation, a request may be sent to a user for the user entropy prior to the updating occurring and a login token may be generated with the received user entropy for the user account on computer device 102. As such, when computer device 102 reboots, the login token may be used to automatically login to the user account on computer device 102 and lock computer device 102. For example, the ARSO component may send a request for the user entropy information and generate a login token for the user account on computer device 102. The ARSO component may send the user entropy information and/or the login token to data protection manager 18 and data protection manager 18 may save the login token.

At 406, method 400 may include receiving a request to persist a level one decryption key in memory after rebooting the computer device. Data protection manager 18 may receive a request to persist the level one decryption key 38 in memory 46 across the reboot event 31. In this case, data protection manager 18 may temporarily prevent the level one decryption key 38 from being removed from memory 46 after the reboot event 31. For example, ARSO component may send a request to data protection manager 18 to persist the level one decryption key 38 in memory 46 across the reboot event 31.

In an implementation, data protection manager 18 may create a token vault in a special encryption functionality or chip, such as a trusted platform module. The token vault may contain two components, for example: (1) an Advanced Encryption Standard AES-256 key to encrypt and/or decrypt the level one decryption key 38 and (2) a login token mapped to the AES-256 key. Data protection manager 18 may pass the level one decryption key 38 with the AES key handle to the token vault. The token vault may encrypt the level one decryption key 38 with the AES key. It should be understood that other types of encryption/decryption keys and/or login tokens may be stored in the token vault At 408, method 400 may include rebooting the computer device 410. A restart and/or reboot event 31 may occur on computer device 102.

At 410, method 400 may include using the user entropy to log into the user account and lock the computer device. When computer device 102 reboots, the user entropy and/or login token may be used to automatically login to the user account on computer device 102 and lock computer device 102.

At 412, method 400 may include using the level one decryption key to access the level one encrypted data while the computer device is locked after rebooting the computer device. The keys currently in memory 46 may be persisted across the reboot event 31. For example, data protection manager 18 may send a request to the token vault to rehydrate the level one decryption key 38. As such, applications 10 may still be able to access level one encrypted data 35 after the reboot event 31 using the level one decryption key 38 until the device state 28 changes. Upon the device state 28 changing to unlocked 32, data protection manager 18 may remove the level one decryption key 38 from the encryption key cache 42, and generate a new level one decryption key for accessing the level one encrypted data 35.

By persisting the decryption keys currently in-memory 46 across the reboot event 31, computer device 102 may remain in the same state of security it was prior to the reboot event 31. As such, after the reboot event 31, computer device 102 may continue to present notifications above the locked screen and/or maintain any alarms previously set prior to the reboot event 31.

Figure 5:
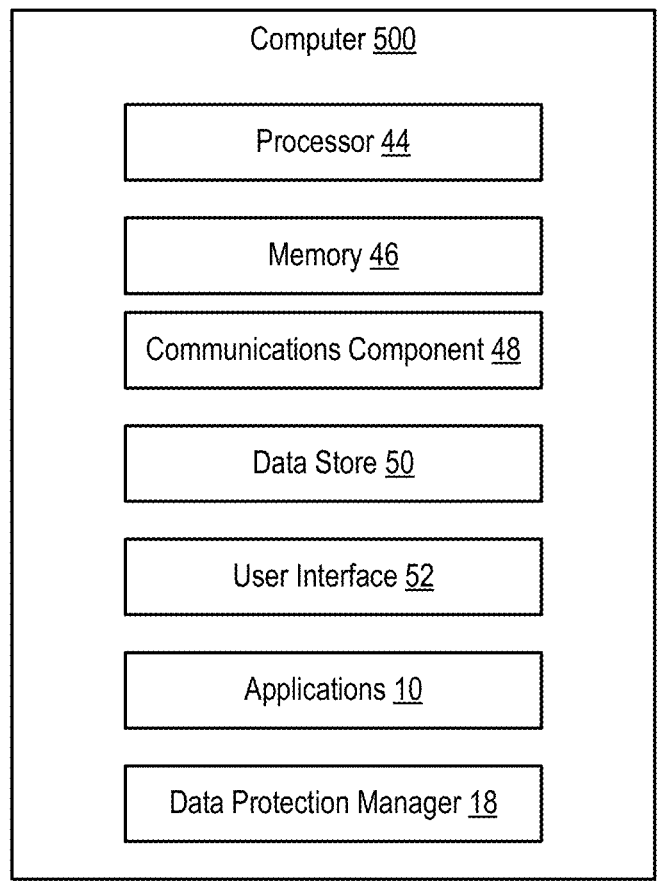
FIG. 5 is a schematic block diagram of an example device in accordance with an implementation of the present disclosure.

Referring now to FIG. 5 an example computer 500 that may be configured as computer device 102 in accordance with an implementation includes additional component details as compared to FIG. 1. In one example, computer 500 may include processor 44 for carrying out processing functions associated with one or more of components and functions described herein. Processor 44 can include a single or multiple set of processors or multi-core processors. Moreover, processor 44 can be implemented as an integrated processing system and/or a distributed processing system.

Computer 500 may further include memory 46, such as for storing local versions of applications being executed by processor 44. Memory 46 can include a type of memory usable by a computer, such as random access memory (RAM), read only memory (ROM), tapes, magnetic discs, optical discs, volatile memory, non-volatile memory, and any combination thereof. Additionally, processor 44 may include and execute operating system 110 (FIG. 1).

Further, computer 500 may include a communications component 48 that provides for establishing and maintaining communications with one or more parties utilizing hardware, software, and services as described herein. Communications component 48 may carry communications between components on computer device 102, as well as between computer device 102 and external devices, such as devices located across a communications network and/or devices serially or locally connected to computer device 102. For example, communications component 48 may include one or more buses, and may further include transmit chain components and receive chain components associated with a transmitter and receiver, respectively, operable for interfacing with external devices.

Additionally, computer 500 may include a data store 50, which can be any suitable combination of hardware and/or software, that provides for mass storage of information, databases, and programs employed in connection with implementations described herein. For example, data store 50 may be a data repository for applications 10 and/or data protection manager 18.

Computer 500 may also include a user interface component 52 operable to receive inputs from a user of computer device 102 and further operable to generate outputs for presentation to the user. User interface component 52 may include one or more input devices, including but not limited to a keyboard, a number pad, a mouse, a touch-sensitive display, a navigation key, a function key, a microphone, a voice recognition component, any other mechanism capable of receiving an input from a user, or any combination thereof. Further, user interface component 52 may include one or more output devices, including but not limited to a display, a speaker, a haptic feedback mechanism, a printer, any other mechanism capable of presenting an output to a user, or any combination thereof.

In an implementation, user interface component 52 may transmit and/or receive messages corresponding to the operation of applications 10 and/or data protection manager 18. In addition, processor 44 executes applications 10 and/or data protection manager 18, and memory 46 or data store 50 may store them.

As used in this application, the terms "component," "system" and the like are intended to include a computer-related entity, such as but not limited to hardware, firmware, a combination of hardware and software, software, or software in execution. For example, a component may be, but is not limited to being, a process running on a processor, a processor, an object, an executable, a thread of execution, a program, and/or a computer. By way of illustration, both an application running on a computer device and the computer device can be a component. One or more components can reside within a process and/or thread of execution and a component may be localized on one computer and/or distributed between two or more computers. In addition, these components can execute from various computer readable media having various data structures stored thereon. The components may communicate by way of local and/or remote processes such as in accordance with a signal having one or more data packets, such as data from one component interacting with another component in a local system, distributed system, and/or across a network such as the Internet with other systems by way of the signal.

Moreover, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

Various implementations or features may have been presented in terms of systems that may include a number of devices, components, modules, and the like. It is to be understood and appreciated that the various systems may include additional devices, components, modules, etc. and/or may not include all of the devices, components, modules etc. discussed in connection with the figures. A combination of these approaches may also be used.

The various illustrative logics, logical blocks, and actions of methods described in connection with the embodiments disclosed herein may be implemented or performed with a specially-programmed one of a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computer devices, e.g., a combination of a DSP and a microprocessor, a plurality of microprocessors, one or more microprocessors in conjunction with a DSP core, or any other such configuration. Additionally, at least one processor may comprise one or more components operable to perform one or more of the steps and/or actions described above.

Further, the steps and/or actions of a method or algorithm described in connection with the implementations disclosed herein may be embodied directly in hardware, in a software module executed by a processor, or in a combination of the two. A software module may reside in RAM memory, flash memory, ROM memory, EPROM memory, EEPROM memory, registers, a hard disk, a removable disk, a CD- ROM, or any other form of storage medium known in the art. An exemplary storage medium may be coupled to the processor, such that the processor can read information from, and write information to, the storage medium. In the alternative, the storage medium may be integral to the processor. Further, in some implementations, the processor and the storage medium may reside in an ASIC. Additionally, the ASIC may reside in a user terminal. In the alternative, the processor and the storage medium may reside as discrete components in a user terminal. Additionally, in some implementations, the steps and/or actions of a method or algorithm may reside as one or any combination or set of codes and/or instructions on a machine readable medium and/or computer readable medium, which may be incorporated into a computer program product.

In one or more implementations, the functions described may be implemented in hardware, software, firmware, or any combination thereof. If implemented in software, the functions may be stored or transmitted as one or more instructions or code on a computer-readable medium. Computer-readable media includes both computer storage media and communication media including any medium that facilitates transfer of a computer program from one place to another. A storage medium may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to store desired program code in the form of instructions or data structures and that can be accessed by a computer. Disk and disc, as used herein, includes compact disc (CD), laser disc, optical disc, digital versatile disc (DVD), floppy disk and Blu-ray disc where disks usually reproduce data magnetically, while discs usually reproduce data optically with lasers. Combinations of the above should also be included within the scope of computer-readable media.

While implementations of the present disclosure have been described in connection with examples thereof, it will be understood by those skilled in the art that variations and modifications of the implementations described above may be made without departing from the scope hereof. Other implementations will be apparent to those skilled in the art from a consideration of the specification or from a practice in accordance with examples disclosed herein.

What is claimed is:

1. A computer device, comprising:
    a memory configured to store data and instructions; and
    a processor in communication with the memory, wherein the processor is configured to:
        generate level two encrypted image data by using a level two encryption key to encrypt image data associated with a camera application;
        access the level two encrypted image data using a level two decryption key, wherein the level two decryption key is configured to be removed from the memory responsive to the computer device being locked;
        determine that a current device state of the computer device is locked;
        remove the level two decryption key from the memory responsive to the computer device being locked;
        use a temporary decryption key in the memory to access the level two encrypted image data for image playback while the computer device is locked, wherein the temporary decryption key is configured to be removed from the memory responsive to the computer device being unlocked;
        determine that the current device state of the computer device has changed to unlocked;
        remove the temporary decryption key from the memory responsive to the computer device being unlocked;
        compute a new level two decryption key responsive to the computer device being unlocked; and
        access the level two encrypted image data using the new level two decryption key.

2. The computer device of claim 1, wherein the processor is further configured to:
    use a level one encryption key to encrypt the image data associated with the camera application; and
    use a level one decryption key to access level one encrypted image data.

3. The computer device of claim 2, wherein the processor is further configured to:
    identify an occurrence of a trigger event; and
    use the level two encryption key to perform additional encryption on the level one encrypted image data in response to the trigger event occurring.

4. The computer device of claim 3, wherein the trigger event is one or more of a device state change, a location change of the computer device, an expiration of a timer, another user account accessing the computer device, removing notifications, user input, a policy push to the computer device, geofencing, a Bluetooth device presence change, a network change, turning off a display, or turning on the display.

5. The computer device of claim 2, wherein the processor is further configured to:
    receive an indication of a reboot event of the computer device.

6. The computer device of claim 5, wherein the processor is further configured to:
    remove the level one decryption key from the memory in response to the reboot event occurring.

7. A computer device comprising:
    a memory configured to store data and instructions; and
    a processor in communication with the memory, wherein the processor is configured to:
        generate level one encrypted data by using a level one encryption key to encrypt data associated with at least one application, wherein the level one encryption key is configured to remain in the memory until the computer device reboots;
        use a level one decryption key to access the level one encrypted data;
        receive an indication of a reboot event of the computer device;
        receive a user entropy;
        maintain the level one decryption key in the memory in response to the reboot event and receiving the user entropy; and
        access the level one encrypted data after the reboot event using the level one decryption key.

8. The computer device of claim 7, wherein the processor is further configured to:
    determine that a current device state of the computer device is unlocked; and
    remove the level one decryption key from the memory.

9. A method comprising:
    generating, by an operating system on a computer device, level two encrypted image data by using a level two encryption key to encrypt image data associated with a camera application;
    accessing the level two encrypted image data using a level two decryption key, wherein the level two decryption key is configured to be removed from a memory of the computer device responsive to the computer device being locked;

determining that a current device state of the computer device is locked;

removing the level two decryption key from the memory responsive to the computer device being locked;

using a temporary decryption key in the memory of the computer device to access the level two encrypted image data for image playback while the computer device is locked, wherein the temporary decryption key is configured to be removed from the memory responsive to the computer device being unlocked;

determining that the current device state of the computer device has changed to unlocked;

removing the temporary decryption key from the memory responsive to the computer device being unlocked;

computing a new level two decryption key responsive to the computer device being unlocked; and accessing the level two encrypted image data using the new level two decryption key.

10. The method of claim 9, further comprising:

using a level one encryption key to encrypt the image data associated with the camera application; and using a level one decryption key to access level one encrypted image data.

11. The method of claim 10, further comprising:

identifying an occurrence of a trigger event; and using the level two encryption key to perform additional encryption on the level one encrypted image data in response to the trigger event occurring.

12. The method of claim 11, wherein the trigger event is one or more of a device state change, a location change of the computer device, an expiration of a timer, another user account accessing the computer device, removing notifications, user input, a policy push to the computer device, geofencing, a Bluetooth device presence change, a network change, turning off a display, or turning on the display.

13. The method of claim 10, further comprising:

receiving an indication of a reboot event of the computer device.

14. The method of claim 13, further comprising:

removing the level one decryption key from the memory in response to the reboot event occurring.

15. A method comprising:

generating, by a processor of a computer device, level one encrypted data by using a level one encryption key to encrypt data associated with at least one application, wherein the level one encryption key is configured to remain in a memory of the computer device until the computer device reboots;

using a level one decryption key to access the level one encrypted data;

receiving an indication of a reboot event of the computer device;

receiving a user entropy;

maintaining the level one decryption key in the memory in response to the reboot event and receiving the user entropy; and accessing the level one encrypted data after the reboot event using the level one decryption key.

16. The method of claim 15, further comprising:

determining that a current device state of the computer device is unlocked; and removing the level one decryption key from the memory.

17. A non-transitory computer-readable medium storing instructions executable by a computer device, comprising:

at least one instruction for causing the computer device to generate level two encrypted image data by using a level two encryption key to encrypt image data associated with a camera application;

at least one instruction for causing the computer device to access the level two encrypted image data using a level two decryption key, wherein the level two decryption key is configured to be removed from a memory of the computer device responsive to the computer device being locked;

at least one instruction for causing the computer device to determine that a current device state of the computer device is locked;

at least one instruction for causing the computer device to remove the level two decryption key from the memory responsive to the computer device being locked;

at least one instruction for causing the computer device to use a temporary decryption key in the memory of the computer device to access the level two encrypted image data for image playback while the computer device is locked, wherein the temporary decryption key is configured to be removed from the memory responsive to the computer device being unlocked;

at least one instruction for causing the computer device to determine that the current device state of the computer device has changed to unlocked;

at least one instruction for causing the computer device to remove the temporary decryption key from the memory responsive to the computer device being unlocked;

at least one instruction for causing the computer device to compute a new level two decryption key responsive to the computer device being unlocked; and at least one instruction for causing the computer device to access the level two encrypted image data using the new level two decryption key.

* * * * *